United States Patent [19]

Matthew et al.

[11] 4,135,912
[45] Jan. 23, 1979

[54] ELECTRIC SMELTING OF LEAD SULPHATE RESIDUES

[75] Inventors: Ian G. Matthew, Victoria; Ralph W. Pickering, Tasmania, both of Australia; Takashi Suzuki; Hisashi Uchida, both of Kagawa, Japan

[73] Assignees: Electrolytic Zinc Company of Australia Limited, Australia; Mitsubishi Metal Corporation, Japan

[21] Appl. No.: 771,429

[22] Filed: Feb. 24, 1977

[30] Foreign Application Priority Data

Feb. 27, 1976 [AU] Australia .................... PC5043

[51] Int. Cl.$^2$ .................. C22B 4/04; C22B 13/06
[52] U.S. Cl. ............................. 75/10 R; 75/77
[58] Field of Search .................... 75/77, 78, 10 R

[56] References Cited

U.S. PATENT DOCUMENTS

| | | | |
|---|---|---|---|
| 3,395,010 | 7/1968 | Shoeld | 75/77 |
| 3,689,253 | 9/1972 | Dorenfeld | 75/77 |
| 3,940,265 | 2/1976 | Wilson | 75/77 |
| 4,030,916 | 6/1977 | Linger | 75/77 |

*Primary Examiner*—P. D. Rosenberg
*Attorney, Agent, or Firm*—Murray & Whisenhunt

[57] ABSTRACT

A process for treatment of lead residues, without prior sintering, in which residues more than 70% of the lead is present as lead sulphates, comprising addition of the said residues, together with a reductant containing carbon and together with fluxes that will react to provide a slag containing FeO, CaO and $SiO_2$, directly to an electric furnace operating at a temperature of 1000 to 1500° C in the slag layer to produce in the furnace a lead bullion. The expression "lead sulphates" will be understood to include lead sulphate and other compounds containing lead and the sulphate ion, for example, the basic lead sulphates.

14 Claims, No Drawings

ELECTRIC SMELTING OF LEAD SULPHATE RESIDUES

This invention relates to a process for the direct electric smelting of lead residues, which may also contain silver and/or gold, to produce high grade lead bullion containing the major proportions of the lead, and of the said precious metals when present.

The process of the present invention is suitable for the treatment of lead residues that remain undissolved after converter dusts and other dusts, produced during the pyrometallurgical production of copper, have been leached in dilute sulphuric acid.

The invention is particularly suitable for the treatment of residues such as those that remain undissolved when solids that contain previously undissolved zinc, copper and cadmium ferrites are subjected to a hot sulphuric acid leaching treatment as part of the process for the production of electrolytic zinc.

During such hot sulphuric acid leaching in the electrolytic zinc process, most of the zinc, copper and cadmium ferrites dissolve, whereas most of the lead, silver and gold remain undissolved and can be separated together with any other undissolved or precipitated solids. These separated solids are frequently referred to as lead residues or as lead silver residues, depending on the amount of silver that is present. For convenience, they are referred to hereinafter simply as lead residues.

The lead, silver and gold that are contained in such lead residues customarily originate as minor constituents of the zinc sulphide flotation concentrates that are used as raw materials for the production of electrolytic zinc. The concentrations of lead, silver and gold in such lead residues depend on the amounts of these elements that were present in the original zinc sulphide concentrates that are processed.

Most of the lead that is contained in the original zinc concentrates is usually in the form of galena, either as individual particles or as constituents of more complex particles. In the course of the normal process for production of electrolytic zinc, the zinc sulphide concentrates are subjected first to a roasting process, to convert the major part of the zinc sulphide to zinc oxide which is readily soluble in dilute sulphuric acid.

During the roasting process, iron compounds that are present in the zinc concentrates tend to combine with part of the zinc, copper and cadmium that are present, to form ferrites which are relatively insoluble in dilute sulphuric acid. As described above, these ferrites are largely dissolved when they are subjected to the hot acid leaching treatment.

Such a hot sulphuric acid leaching treatment is now incorporated in most electrolytic zinc plants, as part of the Jarosite Process, the Goethite Process, or similar processes that are used in the electrolytic zinc industry to recover the zinc, copper and cadmium from their ferrites. See, for instance, the article "Improved leaching technologies in the electrolytic zinc industry" by A. R. Gordon and R. W. Pickering, published in Metallurgical Transactions of AIME, Volume 6B, March, 1975, pp. 43–53.

During the course of the roasting and leaching stages in the processes for production of electrolytic sinc, the lead compounds that were originally present in the zinc concentrates are mostly converted into lead sulphate, although small amounts of compounds such as lead silicate and lead sulphide may be formed or may remain unchanged.

Because the individual particles of zinc sulphide flotation concentrates are necessarily quite small, the lead residues that are separated after hot acid leaching also tend to consist of small particles.

The lead residues that are treated in the process of this invention contain generally less than 60% lead, more than 70% of which lead is present in the form of lead sulphate.

The concentrations of lead, silver and gold in such lead residues usually lie in the ranges
 lead: 10 to 60 percent.
 silver: 10 to 2000 grams per tonne.
 gold: 1 to 100 grams per tonne.

If considered necessary, lead residues containing low concentrations of lead, silver and gold can be concentrated by well-known procedures such as froth flotation before being subjected to the process of this invention.

Small quantities of lead residues have been treated as a minor part of the feed materials treated in existing lead smelters that use sintering and blast furnacing.

The present invention provides a process for treatment of lead residues, without prior sintering, in which residues more than 70% of the lead is present as lead sulphates, comprising addition of the said residues, together with a reductant containing carbon and together with fluxes that will react to provide a slag containing $FeO$, $CaO$ and $SiO_2$, directly to an electric furnace operating at a temperature of 1000° to 1500° C. in the slag layer to produce in the furnace a lead bullion. The expression "lead sulphates" will be understood to include lead sulphate and other compounds containing lead and the sulphate ion, for example, the basic lead sulphates.

The process of the present invention provides a new and elegant method for the treatment of lead residues in which the lead is present at relatively low concentrations and is mostly present in the form of lead sulphate. The process has the advantages of treating the lead residues without the need for prior sintering, and the process is essentially continuous. The main products from the process are a high grade lead bullion containing major proportions of the lead, silver and gold, and a slag containing major proportions of the other constituents, excepting sulphur, of the lead residues. After cooling, such slags are very inert, and they are eminently suitable for disposal in environmentally acceptable ways.

Gaseous emissions from the process consist essentially of carbon oxides and sulphur oxides admixed with air. These gaseous emissions may be subjected to standard procedures for the removal of contained or entrained dust and fume and to standard procedures for absorption and treatment of the sulphur oxides.

The process of the present invention is suitably carried out in an electric furnace, with the electrodes partly immersed in the slag phase. Furnaces of the Heroult type are very suitable, with three or more electrodes.

The furnace is operated at a feed rate and with an electric power input such that the molten slag layer is maintained at a temperature of 1000 to 1500 degrees Celsius, but preferably in the range 1100 to 1350 degrees Celsius.

Because lead residues will usually be separated from process liquors by such standard procedures as thickening, filtering and washing, they will tend to contain in excess of 15% moisture. It is good practice to dry the lead residues to a moisture content of less than 10%, preferably less than 5%, before charging to the electric furnace, thereby eliminating the risk of explosions that might otherwise be caused by evolution of excessive amounts of steam. The lead residue should not, however, be dried to such an extent that dust evolution becomes a problem.

The nature and quantity of the fluxes that need to be added to the lead residues before or during charging to the electric furnace are determined on the basis of obtaining a slag of a composition which exhibits
  (a) a fluidity that allows suitable rates of mass transfer and reaction, and allows suitable rate of settling of the bullion phase
  (b) a conductivity that allows suitable rates of heating as electric current passes between electrodes and bullion through the molten slag
  (c) a low rate of attack on the refractory lining of the furnace
  (d) acceptable elimination of lead and silver into the bullion phase Slags based on the CaO-FeO- $SiO_2$ system, and also containing up to 17.4% ZnO and 12.3% $Al_2O_3$, have been shown to exhibit suitable operating characteristics at temperatures of 1100 to 1380 degrees Celsius. Compositions of some slags that were used during the development and proving of the process of the invention are listed in Table 1, below.

The amounts of the elements present in the slag have been expressed for convenience as their oxides, but this is not meant to imply that the elements are necessarily present as the oxides.

the slag produced during the smelting of lead residues in the electric furnace.

Suitable sources of the necessary reductant containing carbon are materials such as coke, coke breeze (i.e. finely divided coke), graphite, coal char, charcoal, anthracite or coal. Consumption of carbon-containing electrodes also contributes to the overall requirement for reductant containing carbon. Preferably the reductant containing carbon is, or is crushed to be, less than 5 mm.

The amount of reductant containing carbon that is used in the process of this invention is preferably adjusted so as to maintain certain reactions and conditions in the electric furnace.

The quantity of reductant required may be calculated in accordance with the following scheme, which we have devised as an empirical guide, assuming that the amount of carbon required to react with the available oxygen in the residues, the fluxes, and the source of carbon-containing material (hereinafter termed "the charge") is as follows:
  (a) 24 grams of carbon are require for every 207 grams of lead present as lead sulphate in the charge;
  (b) 12 grams of carbon are required for every 112 grams of iron present as ferric oxide or ferrites in the charge;
  (c) 12 grams of carbon are required for every 44 grams of carbon dioxide released by decomposition of carbonates present in the charge.
  (d) 12 grams of carbon are required for each gram-mole of the sulphates of zinc, manganese, magnesium and ferrous iron in the charge;
  (e) 48 grams of carbon are required for every 335

Table 1

| | Dry tonnes of fluxes added/100 tonnes of dry lead residue processed | | | | Average temperature in the slag layer - °C | Slag Compositions | | | | | | |
|---|---|---|---|---|---|---|---|---|---|---|---|---|
| | | | | | | Slag Composition-weight per cent | | | | | | |
| Test No. | Crushed siliceous rock | Lime-stone | Crushed Iron ore | Mild Steel Scrap | | CaO | FeO | $SiO_2$ | ZnO | $Al_2O_3$ | PbO | Remainder |
| 1 | 6.6 | 19.3 | 8.9 | 2.4 | 1280 | 30.2 | 23.1 | 30.0 | 5.7 | 4.6 | 1.5 | 4.9 |
| 2 | 6.0 | 17.9 | 11.6 | 3.2 | 1290 | 28.4 | 28.9 | 26.2 | 6.2 | 6.9 | 0.7 | 2.7 |
| 3 | 2.1 | 8.3 | 3.9 | 0 | 1310 | 26.9 | 23.1 | 27.5 | 10.0 | 7.6 | 2.6 | 2.3 |
| 4 | 2.2 | 8.5 | 4.0 | 0 | 1320 | 23.0 | 25.1 | 24.6 | 11.1 | 12.3 | 4.3 | −0.4 |
| 5 | 1.5 | 8.3 | 11.5 | 3.7 | 1310 | 22.0 | 25.5 | 29.1 | 7.9 | 5.1 | 0.2 | 10.2 |

To obtain slags of suitable compositions, the fluxes to be added will, therefore, be sources of CaO, FeO and $SiO_2$, after taking into account the quantities of calcium, iron, silicon, aluminium and zinc compounds that are present in the lead residues, in the fluxes, and in the reductant containing carbon that is also added.

Limestone is a suitable source of the required CaO. Preferably the limestone is, or is crushed to be, less than 5 mm.

Iron ore, mild steel scrap, zinc plant residues containing zinc ferrite, jarosites, goethite, haematite, or pyrites cinders may be used as sources of FeO. Preferably iron ore is employed and is, or is crushed to be, less than 5 mm. Silica sand or crushed quartz are suitable sources of $SiO_2$. Preferably the silica is, or is crushed to be, less than 5 mm.

Slags that have been produced in other nonferrous or ferrous metallurgical operations may also be used as a source of one or more of the required fluxes. Lead blast furnace slags are particularly suitable. In certain circumstances, it may be beneficial to recycle portion of grams of iron present as jarosites in the charge;
  (f) 12 grams of carbon are required for each gram-mole of calcium sulphate in the charge; and
  (g) 32 grams of elemental sulphur in the charge will remove 32 grams of available oxygen from the charge.

The carbon requirement as so calculated may then be adjusted to allow for air leakage into the furnace atmosphere, and to allow for the amount of carbon arising from consumption of the electrodes in the electric furnace, thereby giving the empirical carbon requirement.

The process of the present invention may be operated successfully with carbon additions which are less than, equal to, or greater than the calculated requirement; data are available covering successful operation of the process over the range 94 to 130% of the empirical requirement of carbon calculated as above.

The mixture of the lead residues, the fluxes, and the reductant containing carbon, is added continuously to the electric furnace. For convenience, the individual constituents of the charge that is to be added to the furnace may be stored in separate bins, and taken from these bins at a regulated rate onto a collecting conveyor, and then into a furnace feeding conveyor such as a screw feeder. More than one feeder may be used, to assist in the distribution of the mixture in the furnace; or the furnace may rotate about a vertical axis.

Feeding of the electric furnace is continuous; but if desired, feeding may be interrupted briefly before and during tapping of the liquid phases, so that more complete separation of the phases can be effected.

At selected intervals the liquid phases are tapped from the furnace. Alternatively, the furnace may be constructed so that the liquid phases are removed continuously from the furnace, and so that the interface (or interfaces) between superimposed liquid layers is (or are) maintained at selected levels. At least two liquid phases, a bullion phase and a slag phase, are produced in the furnace.

Lead bullion produced by the process of this invention is of high grade, with a low total sulphur content generally less than 1%. In excess of 70% of the lead, silver and gold that are contained in the lead residues that are being treated are recovered in the lead bullion.

This lead bullion may be treated further, by known purification procedures, to separate and recover the silver and the gold, and to produce lead metal of any desired purity.

Typically analyses of lead bullion produced using the process of the present invention to treat lead residues of the composition given in Example 1 are shown in Table II below.

Table II

| | | Buillion Compositions | | | |
| | | | BUILLION COMPOSITION | | |
| Test No. | Dry tonnes of coke breeze added/100 tonnes of dry lead residue | Carbon addition as a percentage of emperical requirement | Lead weight % | Total sulphur weight % | Silver gram/tonne | Gold gram/tonne |
|---|---|---|---|---|---|---|
| 1 | 8.4 | 108 | 97.55 | 0.92 | 5310 | 25 |
| 2 | 8.1 | 102 | 97.20 | 0.14 | 4730 | 18 |
| 3 | 6.0 | 119 | 97.16 | 0.46 | 4570 | 19 |
| 4 | 4.1 | 94 | 97.38 | 1.04 | 5320 | 25 |
| 5 | 8.2 | 130 | 97.80 | 0.17 | 4680 | 18 |

The flux additions, average slag temperatures, and the slag compositions for each test have been given previously in Table I.

Actual recoveries of lead, silver and gold in lead bullion when using the process of the present invention are shown in Table III below.

Table III

| Metal Recoveries in Lead Bullion : per cent | | | |
|---|---|---|---|
| Test No. | Lead | Silver | Gold |
| 1 & 2 combined | 96.1 | 94.6 | 100 |
| 3 | 79.2 | 73.5 | 74 |
| 4 | 71.7 | 71.6 | 87 |
| 5 | 92.0 | 88.6 | 100 |

Operating conditions for these tests have been given above in Tables I and II.

As may be seen from the values given in Table I, slags produced according to the process of the invention generally contain a low concentration of lead. Losses of lead in slag are small. The high PbO content of 4.3% obtained in the fourth slag, is attributable to the carbon addition being only 94% of the empirical requirement, whereas the other slags were produced using carbon additions in the range of 100 to 130% of the empirical requirement.

Lead residues that are produced in electrolytic zinc plants, and which are treated according to the process of this invention, may contain impurities in the form of elements or compounds, such as elemental sulphur, gypsum or jarosite, which may cause the formation of a liquid matte phase in addition to the bullion and slag phases.

If the lead residues contain an appreciable quantity of arsenic or antimony then, under certain circumstances, a liquid speiss phase may be formed.

If a third liquid phase is formed in the process, then this phase is removed separately from the furnace. The specific gravities of the liquid phases are quite different, typically slag 3.5, matte 5, speiss 6 and bullion 11, so that a satisfactory separation into separate layers occurs readily in the electric furnace.

In Heroult-type electric furnaces, in which the heat supplied electrically is derived primarily from resistance heating due to the passage of electric current through the slag phase, there is only minor agitation due to inductive stirring. Such inductive stirring assists in obtaining satisfactory mass transfer rates and reaction rates within and between phases, but does not interfere with satisfactory separation of the liquid phases. This is a significant advantage arising from the use of an electric furnace in the process of the present invention, compared with a blast furnace or a rotary furnace, wherein the agitation is too violent, and compared with a reverberatory furnace, wherein the agitation is too slight.

When impurities present in the lead residues tend to cause or accentuate the formation of a matte phase, it has been found that a decrease in the amount of the carbon addition will decrease the amount of matte formed.

It has been found that the addition of scrap mild steel will displace lead, silver and gold from any such matte phase, thereby increasing the recovery of these metals in the lead bullion.

The preferred size of the pieces of scrap mild steel is 0.5 to 50 cm, more preferably 1 to 25 cm. This size ensures that the scrap sinks readily through the uppermost liquid phases to float on the lead bullion and be in direct contact with the liquid matte phase, thereby being in a desirable position to displace lead, silver and gold from the matte into the lead bullion. Comparison of the results (Table III) of tests 3 and 4 with those of 1 and 2 (combined) and 5 demonstrates this effect: scrap iron was only added in tests 1, 2 and 5. In the case of test No. 4, however, as stated previously the lower recovery of lead in lead bullion may be partly attributable to an increased lead concentration in the slag, due to the use of a smaller quantity of carbon.

If the lead residues contain more than 0.1% arsenic, it is preferred to add scrap mild steel to the electric furnace in sufficient quantity to promote the formation of a liquid speiss phase into which the arsenic is concentrated, thus allowing the formation of lead bullion with a lower arsenic content.

It is desirable to add sufficient scrap mild steel so that the concentration of iron in the resulting speiss phase is high enough to extract arsenic from droplets of lead bullion as they descend through the liquid speiss phase into the lead bullion phase.

When liquid speiss phase is tapped from the electric furnace, it is allowed to cool, preferably in pots, to give large lumps of a solid metal-like phase, resistant to weathering, which may be disposed of by storage on land without danger to the environment.

During the treatment of lead residues according to the process of this invention, some of the fine solids that are charged to the electric furnace are carried away in suspension in the gaseous emissions. These solids or dusts may be recovered by standard methods. In addition to dusts, the gaseous emissions will also carry some quantities of fume derived from volatilised metals or compounds, particularly zinc, lead and cadmium. These fumes can also be recovered by standard methods. The dusts and fumes can be recycled to the furnace; or, if their compositions are such as to warrant it, they may first be leached in acid for the extraction of zinc and cadmium, and the resulting residue recycled as part of the feed materials to the furnace.

The invention is illustrated by the following examples

EXAMPLE 1

28.06 tonnes (dry weight) of a lead residue from an electrolytic zinc plant were fed continuously and directly to an 800 kVA Heroult-type electric furnace at an average feed rate of 0.4 tonnes (dry weight) of lead residue per hour.

The lead residue as fed to the furnace contained 3.5% moisture and, expressed on a dry basis, had the following composition:

| Lead | 24.9% | | 6.99 | tonnes |
|---|---|---|---|---|
| Silver | 973 | grams/tonne | 27.3 | kilograms |
| Gold | 3 | grams/tonne | 84 | grams |
| Zinc | 5.4% | | 1.515 | tonnes |
| Iron | 8.0% | | 2.245 | tonnes |
| CaO | 5.5% | | 1.543 | tonnes |
| $SiO_2$ | 6.9% | | 1.936 | tonnes |
| $Al_2O_3$ | 1.8% | | 0.505 | tonne |
| Copper | 0.17% | | 0.048 | tonne |
| Cadmium | 0.05% | | 0.012 | tonne |
| Arsenic | 0.06% | | 0.017 | tonne |
| Antimony | 0.05% | | 0.014 | tonne |
| Magnesium | 0.12% | | 0.034 | tonne |
| Barium | 0.1% | | 0.028 | tonne |
| Potassium | 0.30% | | 0.084 | tonne |
| Sodium | 0.02% | | 0.005 | tonne |
| $NH_4$ | 0.76% | | 0.213 | tonne |

Total sulphur concentration in the residue was 14.75% made up as follows:

| elemental sulphur | 3.5% |
|---|---|
| sulphide sulphur | 0.7% |
| sulphate sulphur | 10.55% |

More than 90% of the lead in the residue was present as lead sulphate.

The electric furnace used was approximately 2.1 meters in internal diameter, and was fitted with three top-entering pre-baked graphite electrodes arranged in an equilateral triangular pattern. The actual electric power being consumed by the electric furnace during the test was approximately 400 kW.

The weights of fluxes and coke breeze which were fed to the electric furnace together with the lead residue were as shown in table IV, below.

Table IV

| Feed Materials Added to the Furnace | | | |
|---|---|---|---|
| | Tonnes, dry weight | Tonnes/day dry weight | Tonnes/100 tonnes of dry lead residue |
| Lead residue | 28.06 | 9.6 | 100 |
| Coke Breeze[1] | 2.31 | 0.79 | 8.2 |
| Silica (crushed siliceous rock) | 0.42 | 0.14 | 1.5 |
| Limestone | 2.33 | 0.80 | 8.3 |
| Crushed Iron Ore[2] | 3.23 | 1.10 | 11.5 |
| Mild Steel Scrap[2] | 1.04 | 0.36 | 3.7 |
| Total | 37.39 | 12.79 | 133.2 |

[1]Additional carbon, at the rate of approximately 5 kg/hr, was supplied by the slow consumption of the pre-baked graphite electrodes in the electric furnace; the overall carbon addition was 130% of the empirical requirement.
[2]The mild steel scrap, of a size in the range 5 to 25 cm was added intermittently to the furnace, but at least once every eight hours.

The power input to the electric furnace was adjusted so that the temperature in the liquid slag phase was in the range 1220 to 1380 degrees Celsius. Three liquid phases were formed during the test - lead bullion, slag and matte. These were tapped intermittently and separately from the furnace. A liquid slag phase at least 10 cm in depth was maintained in the electric furnace at all times. The slag had a composition of 22.0% CaO, 25,5% FeO, 29.1% $SiO_2$, 7.9% ZnO, 5.1% $Al_2O_3$, and 0.2% PbO, the amounts of the elements present in the slag being expressed for convenience as the given oxides.

The gaseous emissions from the electric furnace were cooled by admixture with air and passed through cyclones and a baghouse to separate dusts and fumes.

The weights of the products obtained from the electric furnace during the course of the test are set out in Table V, below together with their lead and silver contents and the percentage distribution of the lead and silver in each product.

Table V

| Products: Lead and Silver Contents: Lead & Silver Distribution | | | | | |
|---|---|---|---|---|---|
| | Weight (dry) | | | Distribution | |
| | Total, tonnes | Pb tonnes | Ag, kg | Pb % | Ag % |
| Feed: | | | | | |
| Lead residue | 28.06 | 6.99 | 27.3 | 100 | 100 |
| Products | | | | | |
| Lead bullion | 5.25 | 5.16 | 25.54 | 72.8 | 83.5 |
| Slag | 9.69 | 0.17 | 0.47 | 2.4 | 1.6 |
| Matte | 4.62 | 0.25 | 2.65 | 3.5 | 9.0 |
| Dusts and fumes: | | | | | |
| Cyclones | 1.39 | 0.42 | 0.82 | 5.9 | 2.8 |
| Bag-house | 2.00 | 1.09 | 0.92 | 15.4 | 3.1 |
| Total | 22.95 | 7.09[1] | 29.40[1] | 100.0 | 100.0 |

[1]Unaccounted gains are due to sampling errors or to analytical errors.

The lead bullion which was produced contained only 0.17% total sulphur, and was subjected to standard procedures of treatment and purification for recovery of silver and gold and to produce metallic lead of a purity of 99.99%.

EXAMPLE 2

Lead residue was treated according to the process of the invention at a rate of 7 tonnes (dry weight) per day in the same 800 kVA Heroult electric furnace as was used in Example 1.

Composition of the lead residue used in this example was as follows:
Lead 39.0%
Copper 2.5%

Arsenic 4.0%
Tin 3.2%

Zinc 9.5%
Cadmium 1.0%
Iron 0.8%
CaO 0.6%
SiO$_2$ 1.4%
Bismuth 0.86%

Total sulphur was 9.0%, all present was sulphate, and more than 70% of the lead in the lead residue was present as the sulphate.

This lead residue was the residue remaining after leaching, in a solution containing sulphuric acid, the dusts and fumes separated from gases leaving the converters used in the pyrometallurgical production of copper.

This lead residue, without prior sintering or other complex pre-treatment, together with the amounts of fluxes and coke breeze as set out in Table VI, was fed directly and continuously into the 800 kVA electric furnace, except during short periods before and during tapping of the liquid phases from the furnace.

Table VI

| Feed Materials Added to the Furnace | | |
|---|---|---|
| | Feed Rate Tonnes (dry)/ /day | Tonnes (dry)/100 tonnes of lead residue |
| Lead residue | 7.00 | 100.0 |
| Coke breeze | 0.82 | 11.7 |
| Limestone | 1.21 | 17.4 |
| Crushed siliceous rock | 0.54 | 7.7 |
| Lead blast furnace slag | 2.50 | 35.9 |
| Mild steel scrap | 1.11 | 15.9 |
| Total | 13.18 | 188.6 |

The mild steel scrap used was similar to that used in Example 1, and was added to the electric furnace intermittently, but at least once every eight hours.

A total of approximately 4kg of additional carbon was supplied per hour from the three pre-baked graphite electrodes in the electric furnace: the overall carbon addition was 104% of the empirical requirement.

The furnace was operated with measured slag temperatures in the range 1120 to 1300 degrees Celsius. Three liquid phases — lead bullion, slag and speiss — were produced in the furnace and were tapped intermittently and separately. The slag layer was always maintained at a minimum depth of 10 cm. The slag had a composition of 18.0% CaO, 30.0% FeO, 18.0% SiO$_2$, 17.4% ZnO, 3.4% Al$_2$O$_3$, and 2.5% PbO, the amounts of the elements present in the slag being expressed for convenience as the given oxides. The gases emanating from the electric furnace were cooled by admixture with air, and were passed through cyclones and a baghouse to separate dusts and fumes.

The weights of products obtained from the electric furnace are set out in Table VII, below, together with their lead, silver, gold and arsenic contents. The percentage distribution of the elements in the products is also shown.

Table VII

| | Tonnes per day | Products: Metal Contents: Metal Distribution | | | | | | | |
|---|---|---|---|---|---|---|---|---|---|
| | | Pb t/d | Ag kg/d | Au g/d | As t/d | Pb | Ag distribution, | Au | As % |
| Bullion | 2.79 | 2.48 | 1.04 | 2.79 | 0.03 | 87.3 | 86.1 | 86.7 | 9.9 |
| Slag | 6.29 | 0.14 | 0.025 | Trace | 0.05 | 5.0 | 2.1 | Trace | 16.0 |
| Speiss | 0.64 | 0.04 | 0.11 | 0.14 | 0.19 | 1.4 | 8.9 | 4.4 | 66.7 |
| Dusts | 0.71 | 0.18 | 0.035 | 0.29 | 0.02 | 6.3 | 2.9 | 8.9 | 7.4 |
| Totals | 10.43 | 2.84 | 1.21 | 3.22 | 0.29 | 100 | 100 | 100 | 100 |

The lead bullion contained less than 0.5% sulphur.

The lead bullion contained approximately 10% of the arsenic from the lead residue, at a concentration of approximately 1%. The speiss, however, contained approximately 67% of the arsenic from the lead residue, at a concentration of approximately 30%. Thus, the major proportion of the arsenic that was contained in the residue has been removed in the inert speiss phase that was formed.

The bullion was subjected to standard procedures of treatment and purification for recovery of silver and gold and to produce metallic lead of the required purity.

Since other modifications within the spirit and scope of the invention may readily be effected by persons skilled in the art, it is to be understood that this application is not limited to the particular embodiments described by way of example hereinabove.

The claims defining the invention are as follows:

1. A process for the recovery of lead and silver values from lead silver residues in which more than 70% of the lead is present as lead sulfates, by treating, without prior sintering, said lead silver residues, said process comprising adding directly, simultaneously and essentially continuously to a Heroult electric furnace:
   (a) said lead silver residues;
   (b) a carbon-containing reductant; and
   (c) fluxes for producing a slag containing FeO, CaO and SiO$_2$; and
   controlling the temperature of the molten slag layer in the Heroult electric furnace to lie within the range of 1000°–1500° C. to produce at least two molten phase separate layers in said furnace, one of said layers being a slag layer, and another of said layers being a lead silver bullion layer; and
   recovering from said furnace a lead silver bullion containing less than 1.1% sulfur and a slag containing no more than 4% of lead.

2. Process according to claim 1 wherein the flux source for CaO is limestone, the flux source for FeO is selected from the group consisting of iron ore, mild steel scrap, zinc plant residues containing zinc ferrite, jarosites, goethite, haematite, and pyrites cinders, and the flux source of SiO$_2$ is silica sand, or crushed quartz.

3. Process of claim 1, wherein the amount of carbon added in the form of the said carbon-containing reductant, together with carbon added by other sources, is in the range of 94 to 130% of the amount of carbon calculated according to the total of the following:
   (a) 24 g of carbon for every 207 g of lead present as lead sulfate in said lead silver residues;
   (b) 12 g of carbon for every 112 g of iron present as ferric oxide or ferrites in the charge to the Heroult furnace;
   (c) 12 g of carbon for every 44 g of carbon dioxide released by decomposition of carbonates in said Heroult furnace;

(d) 12 g of carbon for each g mole of zinc sulfate, manganese sulfate, and ferrous iron sulfate in the charge to the Heroult furnace;

(e) 48 g of carbon for every 335 g of iron present as jarosites in the charge;

(f) 12 g of carbon for each g mole of calcium sulfate in the charge to the said Heroult furnace, the total amount of carbon so calculated being adjusted (i) on the basis that 32 g of elemental sulfur in the charge will remove 32 g of available oxygen from the charge and (ii) for air leakage into the Heroult furnace atmosphere.

4. Process according to claim 1 in which the temperature in the molten slag layer is maintained in the range of 1100° to 1350° C.

5. Process according to claim 1 in which gold is present in the lead silver residues, and the lead silver bullion contains at least 70% of the lead, silver and gold present in the said residues.

6. Process according to claim 1 in which the lead silver residue is a lead silver residue separated after hot acid leaching of ferrites in a process for the production of electrolytic zinc.

7. Process according to claim 1 in which the lead silver residue is a residue separated after acid leaching of dusts produced in a process for the production of copper.

8. Process according to claim 1 in which scrap iron is added to the Heroult furnace to displace lead, silver and gold from a matte phase into the bullion.

9. Process according to claim 1 in which scrap iron is added to the Heroult furnace to promote the formation of a spiess phase into which arsenic is extracted thereby producing a lead silver bullion with an arsenic concentration below 1.5%.

10. A process for the treatment, without prior sintering, of lead silver residues containing about 10 to about 60% by weight of lead, and about 10 to about 2000 grams of lead silver per tonne and other metallic values, wherein more than 70% of the lead is present as lead sulfates, to at least substantially separate lead, silver and any gold values present from other metallic values of said residues, said process comprising simultaneously and substantially continuously adding to a Heroult furnace:

(a) said lead silver residues;

(b) a carbon-containing reductant; and (c) fluxes for producing a slag containing FeO, CaO and $SiO_2$, and operating said electric furnace at a slag layer temperature of 1000° to 1500° C. to produce at least two layers in said furnace, one of said layers being a slag layer, and another of said layers being a bullion layer, wherein said bullion layer contains the major proportions of lead, silver and any gold present in said lead silver residue and contains less than 1.1% sulfur, and the remaining layers, including the slag layer, contain the major proportions of other metallic values of said lead silver residues and contain no more than 4% lead.

11. Process of claim 10, wherein said fluxes are limestone, iron ore and silica.

12. Process of claim 10, wherein the amount of carbon added in the form of said carbon-containing reductant, together with carbon added by other sources, is in the range of 94 to 130% of the amount of carbon calculated according to the total of the following:

(a) 24 g of carbon for every 107 g of lead present as lead sulfate in said lead silver residues;

(b) 12 g of carbon for every 112 g of iron present as ferric oxide or ferrites in the charge to the electric furnace;

(c) 12 g of carbon for every 44 g of carbon dioxide released by decomposition of carbonates in said electric electric furnace;

(d) 12 g of carbon for each g mole of zinc sulfate, manganese sulfate, magnesium sulfate and ferrous iron sulfate in the charge to said electric furnace;

(e) 48 g of carbon for every 35 g of iron present as jarosite in the charge to the electric furnace;

(f) 12 g of carbon for each g mole of calcium sulfate in the charge to the electric furnace, the total amount of carbon so calculated being adjusted (i) on the basis that 32 g of elemental sulphur in the charge will remove 32 g of available oxygen from the charge and (ii) for air leakage into the Heroult furnace atmosphere.

13. Process of claim 10, wherein three phases are formed in said electric furnace, the third phase being a matte phase, and scrap iron or scrap mild steel is added to said electric furnace to displace lead, silver and gold present from said matte phase into said lead silver bullion.

14. Process of claim 10, wherein scrap iron or scrap mild steel is added to said electric furnace to promote the formation of a third phase, which is a speiss phase, and arsenic in said electric furnace is extracted into said speiss phase to thereby produce a lead silver bullion having an arsenic concentration of less than 1.5%.

* * * * *